Apr. 10, 1923.
H. S. ESCH
1,451,013
ARTICULATED TIRE GUARD
Filed July 7, 1920
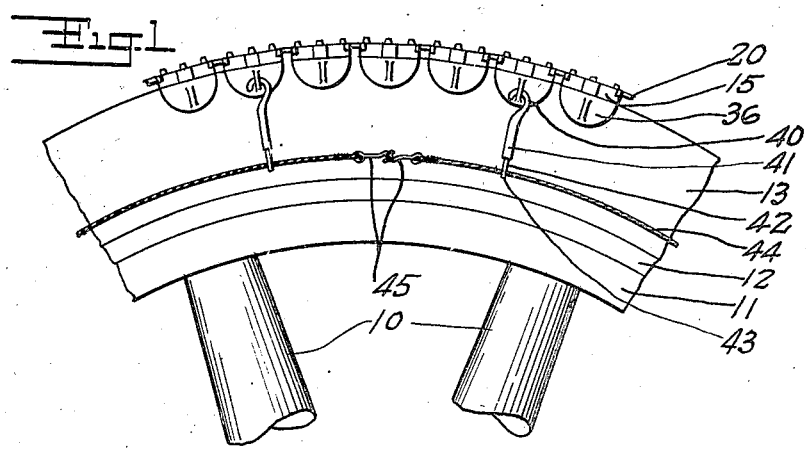
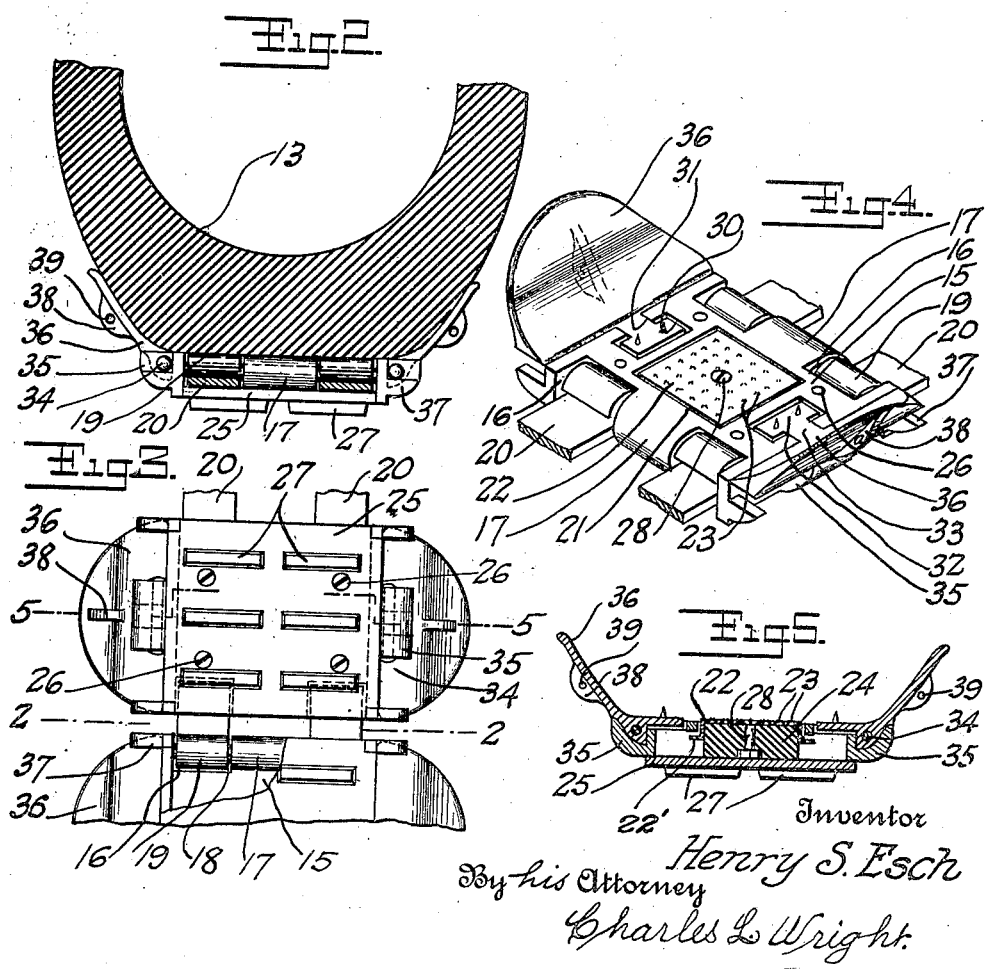
Inventor
Henry S. Esch
By his Attorney
Charles L. Wright.

Patented Apr. 10, 1923.

1,451,013

UNITED STATES PATENT OFFICE.

HENRY S. ESCH, OF NEW YORK, N. Y.

ARTICULATED TIRE GUARD.

Application filed July 7, 1920. Serial No. 394,488.

*To all whom it may concern:*

Be it known that I, HENRY S. ESCH, a citizen of the United States, residing in New York, in the county of New York and State of New York, have invented certain new and useful Improvements in Articulated Tire Guards, of which the following is a specification.

The main object of this invention is to provide a tire guard composed of a plurality of composite guard elements, articulated and arranged in a circumferential row about the periphery of a vehicle tire, particularly of the pneumatic type, whereby the tire is protected from abrasion by contact with the road and rendered essentially invulnerable to punctures.

A further object is to provide these elements with cushioned, ground gripping spurs, materially increasing the tractive effect of the wheels and tending to avoid lateral sliding or slipping of the same.

Still further objects are in the production of a tire guard that is highly flexible, will not interfere with the resiliency of the tire, and in which the parts subject to wear are easily renewable and cheaply constructed.

These several specified objects are attained by the novel feature of construction of parts and their arrangement, as hereafter described and shown in the annexed drawings, constituting a component and essential part of the disclosure, and in which:—

Figure 1 is a side elevational view showing an application of a tire guard made in accordance with the invention.

Figure 2 is an enlarged fragmentary transverse sectional view, the section being taken approximately on line 2—2 of Fig. 3.

Figure 3 is a plan view of the guard elements looking from the outside.

Figure 4 is a perspective view of the same looking from the inside.

Figure 5 is a transverse sectional view taken on line 5—5 of Fig. 3.

Referring to the drawings, the numeral 10 designates the spokes of a wheel, the same being secured in a rim 11 provided with the usual clamping rings 12 for securing the tire 13, all of these parts being of conventional construction and adapted to be used in connection with an inner inflatable tube (not shown).

The invention comprises a plurality of frames 15, preferably made of steel, having a level inner surface, or slightly curved to conform to the circumference of the tire. Recesses 16 are formed in the front and rear edges, having between them rounded projections 17 drilled to receive pins 18 extending equally out at both ends and which act as hinge elements receptive of the looped or curled ends 19 of pairs of links 20 by which the frames are connected in series.

An opening 21 is formed centrally in the frame receptive of a metal pan 22 free to move in all directions but prevented from outward displacement by the projecting flanges 22′, the outer face of the pan is provided with corrugations 23 adapted to engage the surface of the tire and contained within the side walls of the pan is a block 24 of rubber or like elastic material forming a supplementary cushion for the tread plates 25.

Disposed upon the outer surface of the frame is a plate 25 held by screws 26 so as to permit removal, the plates being interchangeable, each having upon their faces a plurality of elongated spurs 27 adapted to be impressed into the road bed affording an effective grip, avoiding slip and protecting the tire from road wear.

At the center the plate 25 rests upon the block 24 which is loose in the frame and held in the pan by the center screw 28.

Formed in the lateral edges of the frame are recesses 30 having contracted openings 31 receptive of necks 32 joined to heads 33 free within the recesses 30 and held by pins 34 passing through lugs 35 extending outward from the face of the frames on each side at the center.

The necks 33 are formed with curved wings 36 having arcuate profiles and slightly outturned edges at their extremities, the wings being adapted to engage the outer sides of the tire as best shown in Fig. 2 and being self conforming thereto.

Also extending out from the sides of the frame, at the corners, are lugs 37, which serve to prevent damage to the wings and also to aid in clearing the wheels from a car track.

Formed on the exterior of the wings 36 are thin vertical lugs 38, containing openings 39 adapted to receive hooks 40 having stems 41, containing rods 42 adjustably secured therein, these rods having eyes 43 at their ends receptive of cables 44 normally disposed at the sides of the tire and held by engaging elements 45 at their ends, as shown in Fig. 1.

Thus by tightening the cables all of the several hooked connections are drawn towards the center of the wheel and the several guard elements bound firmly upon its surface.

Having thus described my invention and set forth the manner of its construction and use, what I claim as new and desire to secure by Letters Patent, is:—

1. A tire guard comprising a plurality of chambered frames, links arranged in pairs loosely connecting the frames, resilient blocks in the chambers of said frames, and spurred plates removably secured to said frames in contact with said blocks.

2. A tire guard comprising a plurality of tread frames each having a pocket, an inverted pan in each pocket, said pans having an outer corrugated surface, resilient blocks in said pans, flexing means connecting said frames, facing plates on said frames over said blocks and spurs formed with said facing plates.

3. A tire guard comprising a plurality of tread frames each having a pocket, an inverted pan in each pocket, said pans having an outer corrugated surface, resilient blocks in said pans, flexing means connecting said frames, facing plates on said frames over said blocks, spurs formed with said plates and detachable means connecting the plate to the frames.

4. A tire guard comprising a plurality of frames, link connections therebetween, and wings pivotally engaged in said frames contactable with the sides of the tire.

5. A tire guard comprising a series of frames disposed transversely on the face of the tire, means flexibly engaging between said frames, wings pivotally engaged in the sides of said frames, lugs on said wings, and cables with means for passing through openings in said lugs whereby said frames are bound to the tires.

6. A tire guard comprising a plurality of frames, articulating links for said frames, laterally extending wings pivoted to the frames, calk plates removably engaged with said frames, and resilient blocks disposed in said frames between said calk plates and the tire.

7. A tire guard comprising a plurality of hollow frames, pairs of articulating links engaging adjacent frames, lateral wings pivoted in the sides of the frames, lateral corner extensions on said frames, resilient blocks disposed in the frames, spurred plates screw fastened to the frames over said links and blocks, and cables on each side of the tire engaging certain of the wings.

8. A tire guard comprising a plurality of hollow frames, pairs of articulating links engaging adjacent frames, lateral wings pivoted in the sides of the frames, perforated lugs on the exterior of said wings, inverted pans disposed in central openings in said frames, corrugations on the outer surface of said pans adapted to impinge on the tire, resilient blocks in said pans, spurred plates removably engaged on said frames over said block, and means adapted to pass through the perforations in said lugs whereby the guards are constrained to the tire.

In testimony whereof I have signed my name to this application.

HENRY S. ESCH.